United States Patent [19]

Grimsdale et al.

[11] 4,107,780

[45] Aug. 15, 1978

[54] DISPLAY APPARATUS

[75] Inventors: Richard Lawrence Grimsdale, Brighton; Philip John Willis, Shoreham-by-Sea; Aris Hadjiaslanis, Brighton, all of England

[73] Assignee: National Research Development Corporation, London, England

[21] Appl. No.: 762,799

[22] Filed: Jan. 25, 1977

[30] Foreign Application Priority Data

Jan. 28, 1976 [GB] United Kingdom ............... 03301/76

[51] Int. Cl.[2] ......................... G06F 15/20; G09B 9/08

[52] U.S. Cl. ............................ 364/521; 340/324 AD; 35/12 N; 358/104

[58] Field of Search ................. 235/198, 151; 35/10.2, 35/12 N; 358/104, 903; 340/324 AD, 27 NA; 315/367, 368, 383; 364/521, 855

[56] References Cited

U.S. PATENT DOCUMENTS

| | | | |
|---|---|---|---|
| 3,619,912 | 11/1971 | Conant et al. | 358/104 X |
| 3,665,408 | 5/1972 | Erdahl et al. | 340/324 AD |
| 3,697,681 | 10/1972 | McCoy | 35/12 N UX |
| 3,705,263 | 12/1972 | Rittenhouse | 340/324 AD X |
| 4,016,658 | 4/1977 | Porter et al. | 358/104 X |

*Primary Examiner*—Joseph F. Ruggiero
*Attorney, Agent, or Firm*—Cushman, Darby & Cushman

[57] ABSTRACT

A raster display can be built up from a number of zones. A data processor is described for controlling the intensity and hue of such a zone from information supplied defining the boundaries of the zone, its intensity and hue. The control and allocation to zones of a number of such data processors is also described.

13 Claims, 14 Drawing Figures

DISPLAY APPARATUS

Figure 1:
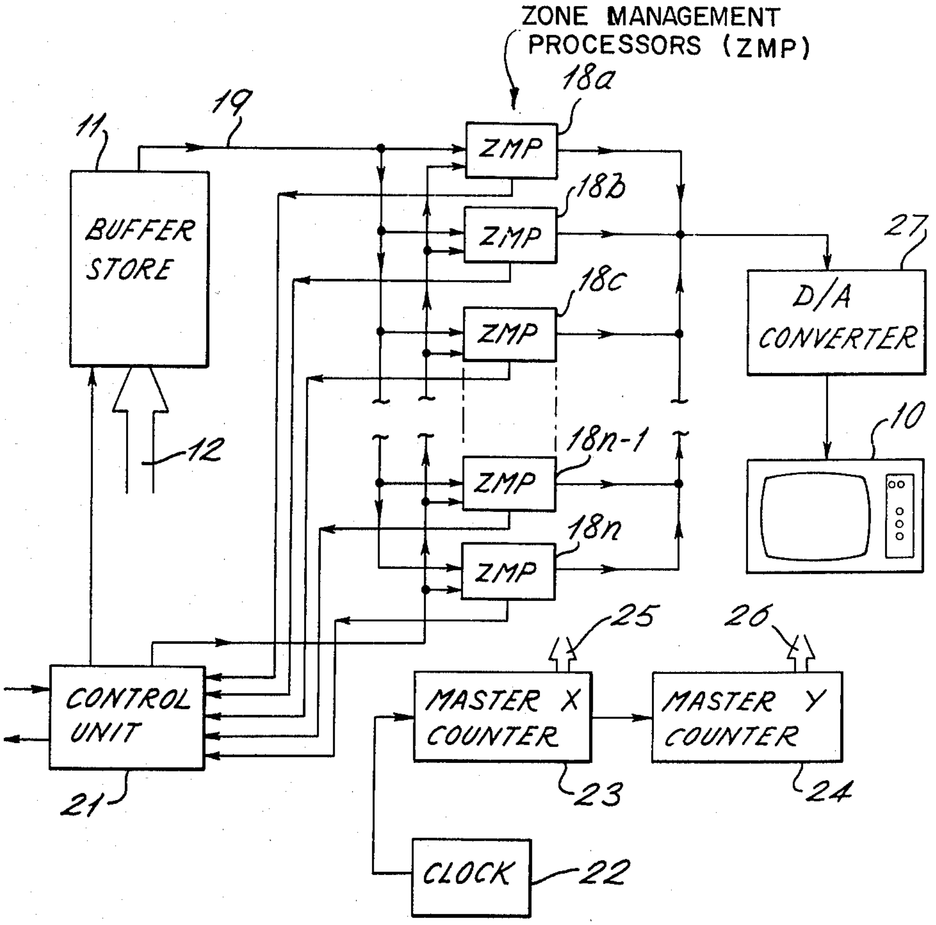

The present invention relates to apparatus for use in providing synthesised raster displays rather than displays from recorded video signals. The raster is particularly, but not exclusively, produced by sweeping a cathode ray tube as in television.

Usually the display is pictorial, computer generated and changes rapidly in real time. Such a display may be used in simulators for training the crew of aircraft, shipping or space vehicles although a variety of other applications is possible. The use of this type of display in flight simulators is of particular importance since there is considerable interest in using a computer generated display as a replacement for the conventional system in which the display is provided by causing a television camera to traverse a large three-dimensional model of terrain.

An object of the invention is to improve the performance and reduce the cost of computer image generation.

According to a first aspect of the present invention there is provided a data processor for providing intensity control signals for use in a raster display, including a local store for storing signals defining the boundaries of a zone to be displayed, calculation means for deriving signals representing the co-ordinates of points in the zone boundaries from the signals stored, comparison means for comparing signals representing the co-ordinates of the current display point in a display raster with the signals representing the co-ordinates of the said points, and local control means, coupled to the comparison means, for passing control signals for determining the intensity of the display within the zone to the output of the processor when the said co-ordinates of the current display point are within the zone.

An advantage of the present invention is that the data processors according to the first aspect of the invention may be regarded as special purpose computers. As will be explained the data processors may be operated in parallel and this gives an improvement in performance.

The signals defining the zone to be displayed may include signals representing the co-ordinates in a first direction at right angles to the lines of the raster of the two extremes of the zone, and signals defining first and second boundaries of the zone between the raster lines containing the said extremes. The calculation means may then be constructed to derive the co-ordinate signals from the signals representing the extremes of the zones and the signals defining the boundaries.

Usually the first direction and a second direction are the vertical (Y) and the horizontal (X) co-ordinates of a display and the raster lines making up the display are parallel to the second direction.

The signals defining the zone boundaries may include signals specifying the difference between successive X co-ordinates in a left-hand boundary of the zone and the difference between the successive X co-ordinates in a right-hand boundary of the zone. The calculation means may then include means for calculating the X co-ordinates of the left and right-hand boundaries in each line from these differences as soon as the previous line has been displayed.

Second, third and higher differences between X co-ordinates of the left and right zone boundaries in successive lines may also be stored when the calculation means may use these higher order differences in calculating the co-ordinates of the boundaries in one line from those in the previous line. With this scheme for signals defining a zone, four-sided zones may be generated in which the top and bottom boundaries of the zone are raster lines or parts thereof which may if required be reduced to points, and the left and right boundaries of the zone are straight lines or regular curves.

In another scheme for four-sided zones the signals stored may include the X and Y co-ordinates of an upper point of the zone, the Y co-ordinates of left and right extremes of the zones, differences in the X co-ordinates of the upper point and the left and right extremes - allowing the X co-ordinates of the left and right extremes to be derived, the Y co-ordinates of a lower point of the zone and the differences between the X co-ordinates of the left and right extremes of the zone and of the lower point - allowing the co-ordinates of the bottom of the zone to be derived.

Many other schemes for representing zones of the same or different shapes, including any form of polygon, will be apparent.

Apparatus for supplying intensity control signals for a complete raster display may include a plurality of data processors according to the first aspect of the invention and control means for allocating the data processors to zones to be controlled.

According to a second aspect of the present invention there is provided apparatus for controlling intensity in a raster display, including a plurality of data processors each capable, when supplied with signals defining a zone of the display, of managing the display of the zone by providing intensity control signals when the zone is to be displayed, further control means for allocating the data processors to zones, and means for transferring signals defining zone boundaries to the data processors under the control of the further control means.

A buffer store may be provided in which signals defining the boundaries of all zones in a display are stored, the control means being constructed to control the transfer of signals defining a zone to a data processor when the processor is allocated to that zone.

Often displays will include areas where one zone is superimposed on another. The apparatus may therefore include means for comparing the priorities of zones as contained by storage means in the data processors, this comparison means being adapted to pass control of the display to the data processor having the higher priority.

The buffer means is usually supplied with the signals defining the zones from a computer in which these signals have been derived in accordance with a display to be provided.

The apparatus may include X co-ordinate and Y co-ordinate counters coupled to a clock-pulse generator for providing signals representing the current X and Y co-ordinates of the means sweeping out the display.

The local store of each data processor may store signals defining the intensity of a zone, these signals being passed to a digital to analogue converter as the intensity control signals under the control of the data processor. The apparatus may then include raster display means, such as a television monitor, having its electron gun coupled to the converter so that the intensity of light appearing at any time in the spot sweeping out the raster is controlled by the output signals of the digital to analogue converter.

Where a display is to be in colour, the local store may also store signals defining hue, these signals also being passed to the digital to analogue converter under the control of the dataprocessor control signals. The intensity of the colours may be calculated in a similar way to the calculation of X co-ordinate values and thereby changed within a zone to create shading.

Although various means have been specified in defining the invention, it will be understood that at least some circuits may be dual function, for example the calculation means may also be used in another mode as part of the comparison means for comparing signals representing the current co-ordinates of the means sweeping out the display raster with the signals representing the co-ordinates of points in the zone boundaries.

Although the invention will be specifically described in the form of circuits, it will also be understood that the various means may be parts of a computer programmed to provide the data processors and apparatus specified as making up the various aspects of the invention.

Certain embodiments of the invention will now be described, by way of example, with reference to the accompanying drawings in which:

FIG. 1 is a block diagram including apparatus according to the second aspect of the invention for providing a raster display from zone parameters generated in a computer.

Figure 2:
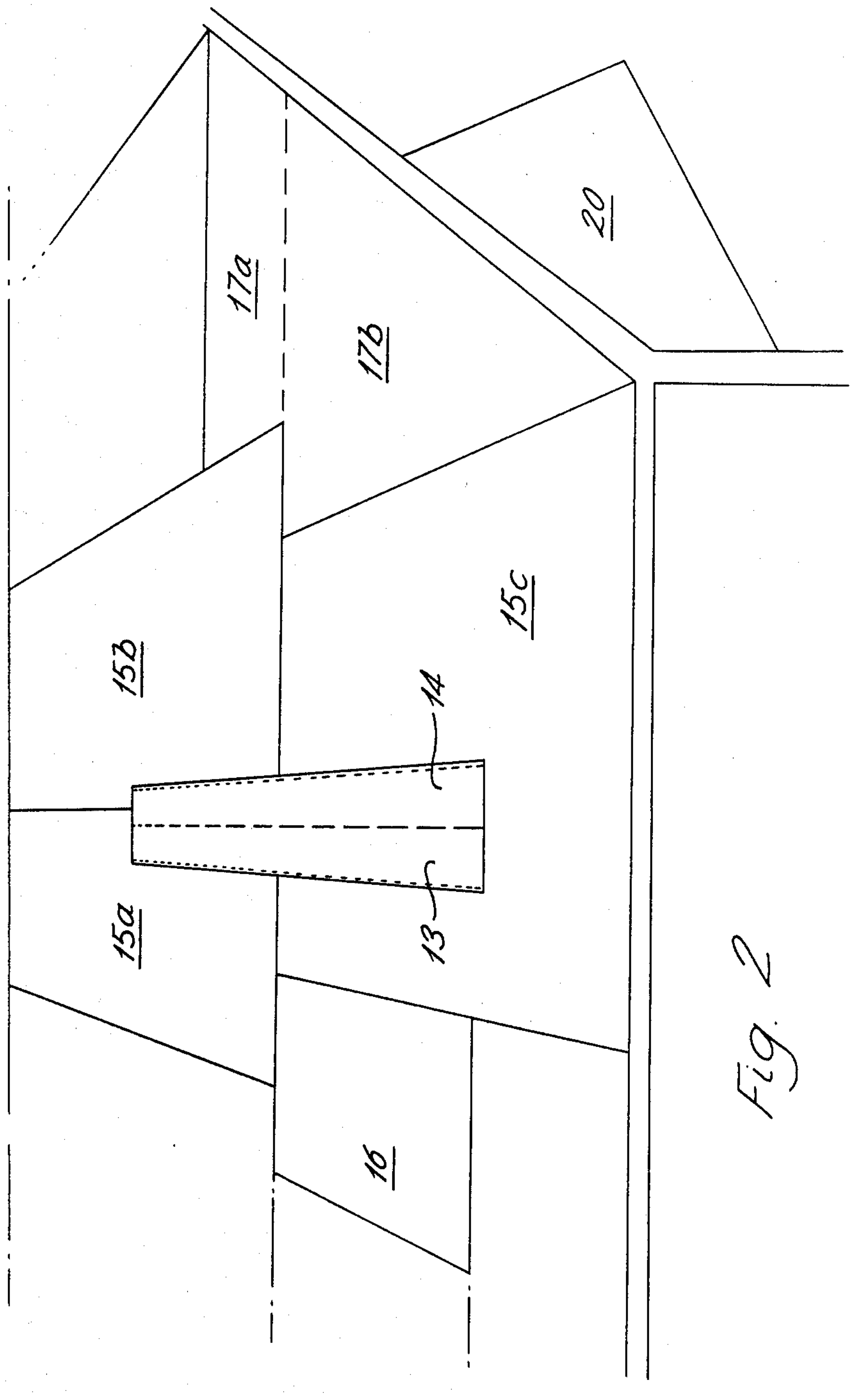
Figure 3:
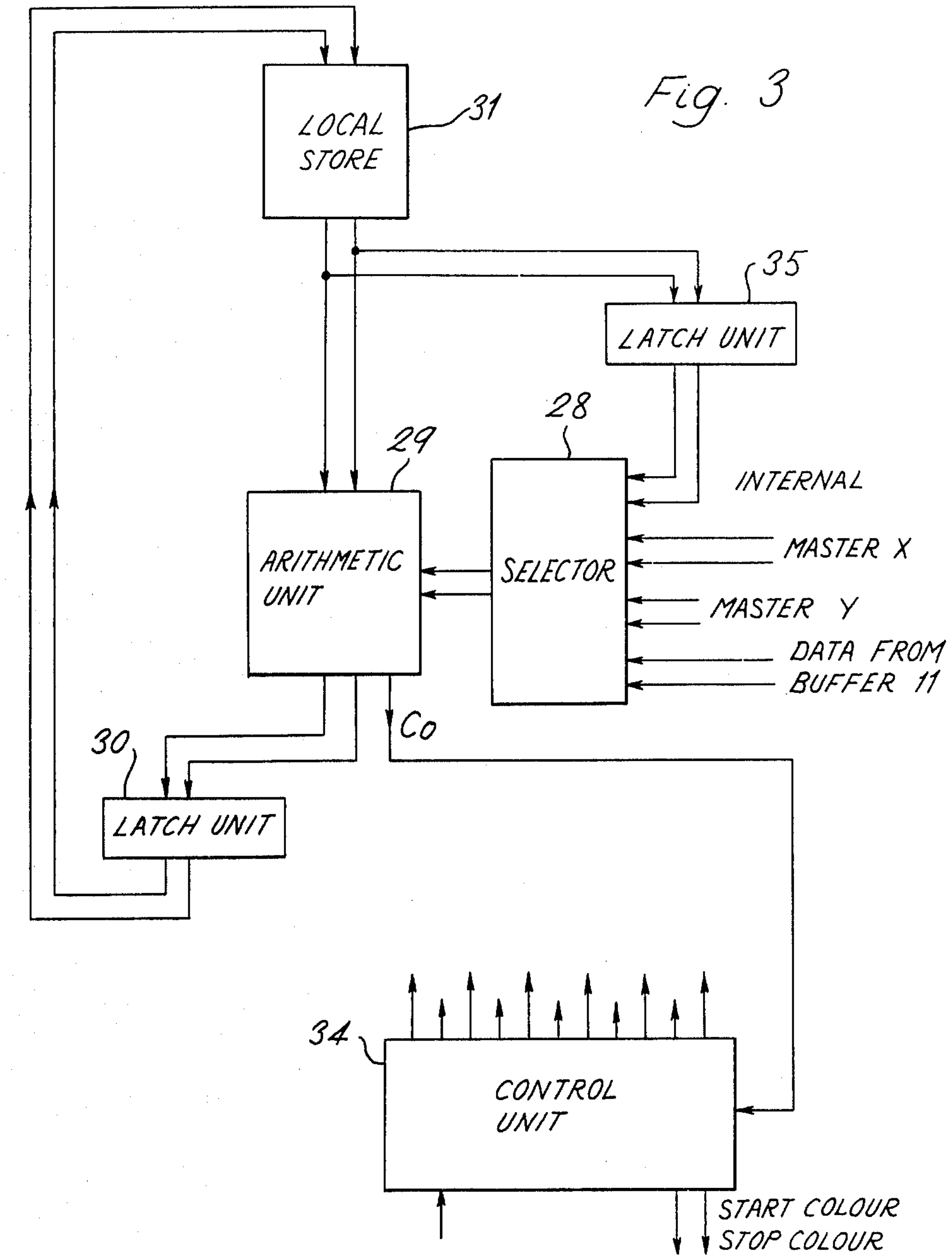
Figure 4:
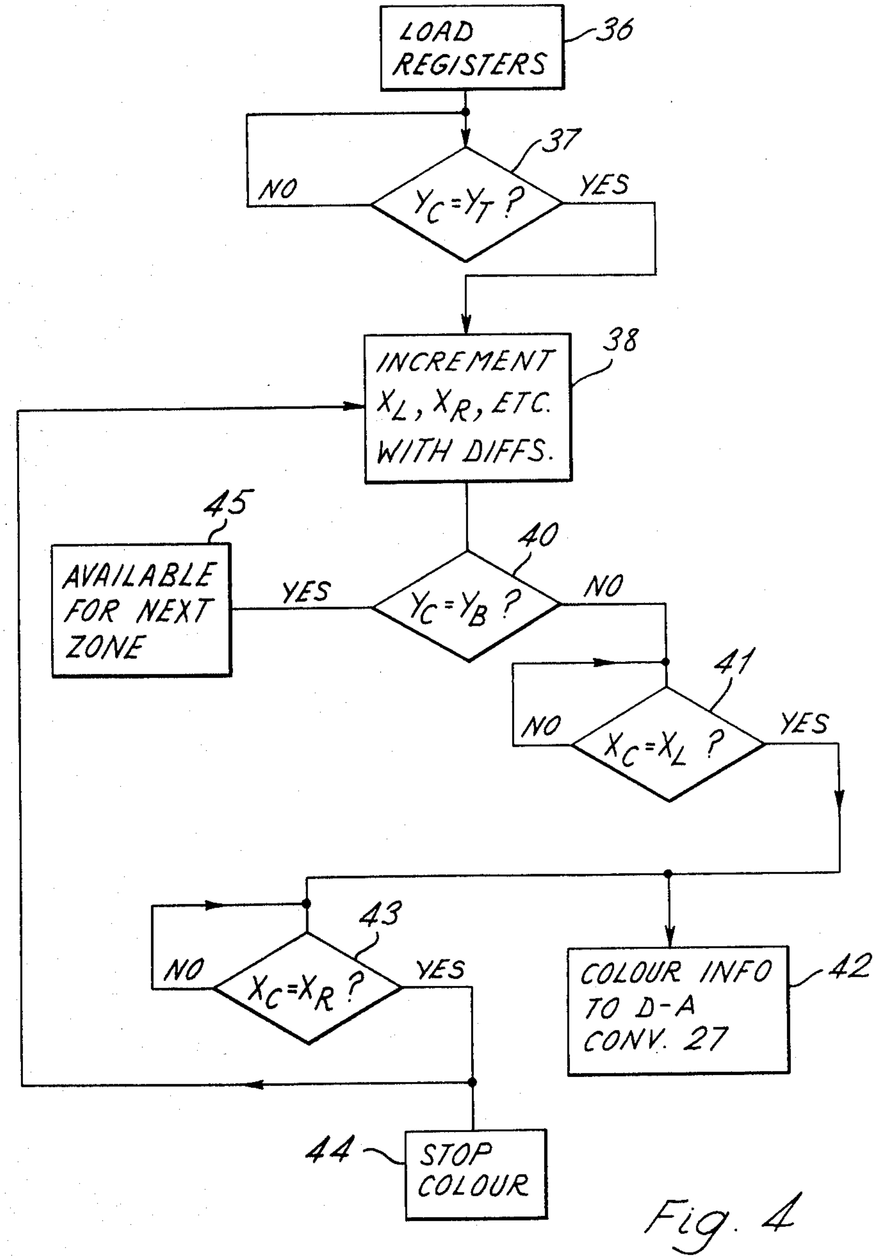
Figure 5A:
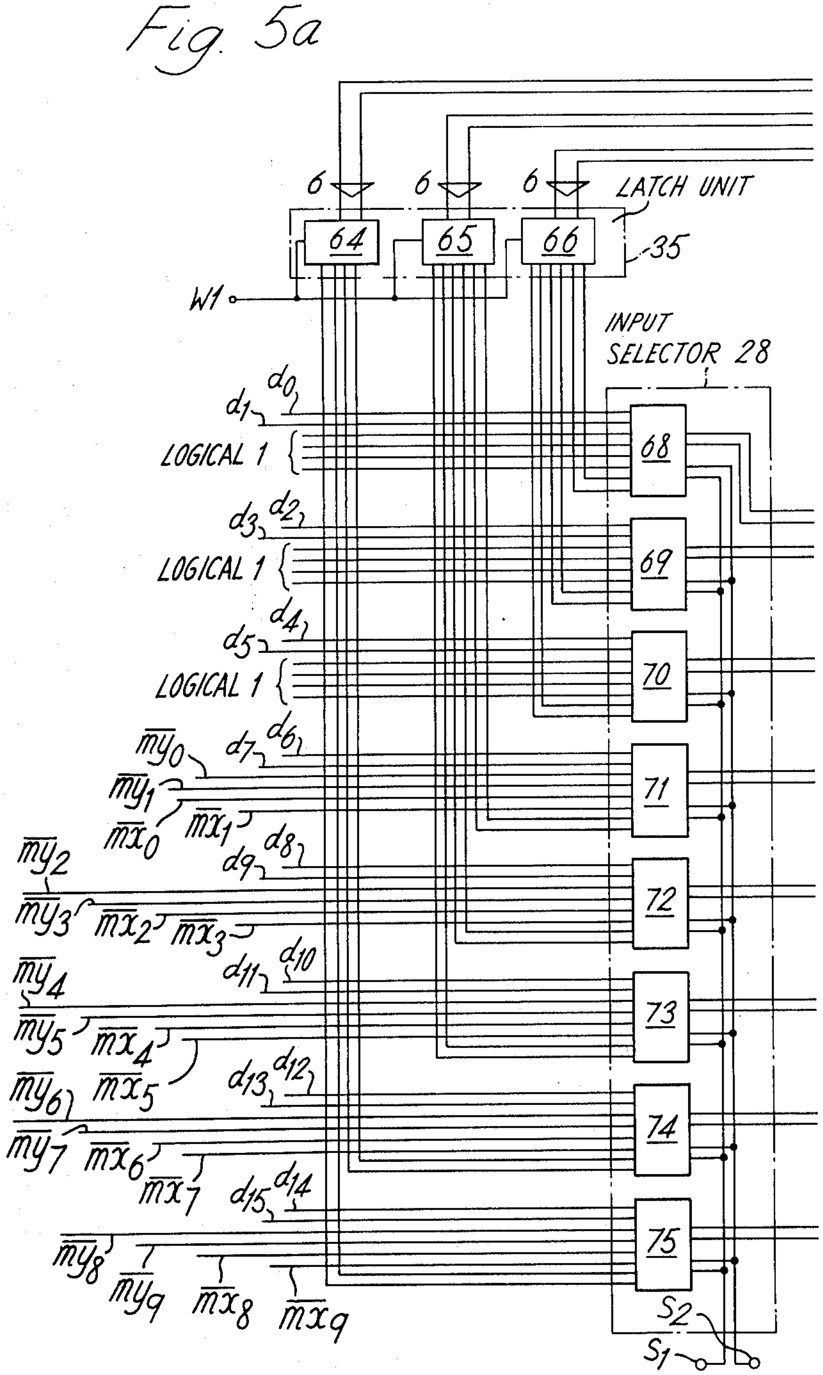
Figure 5B:
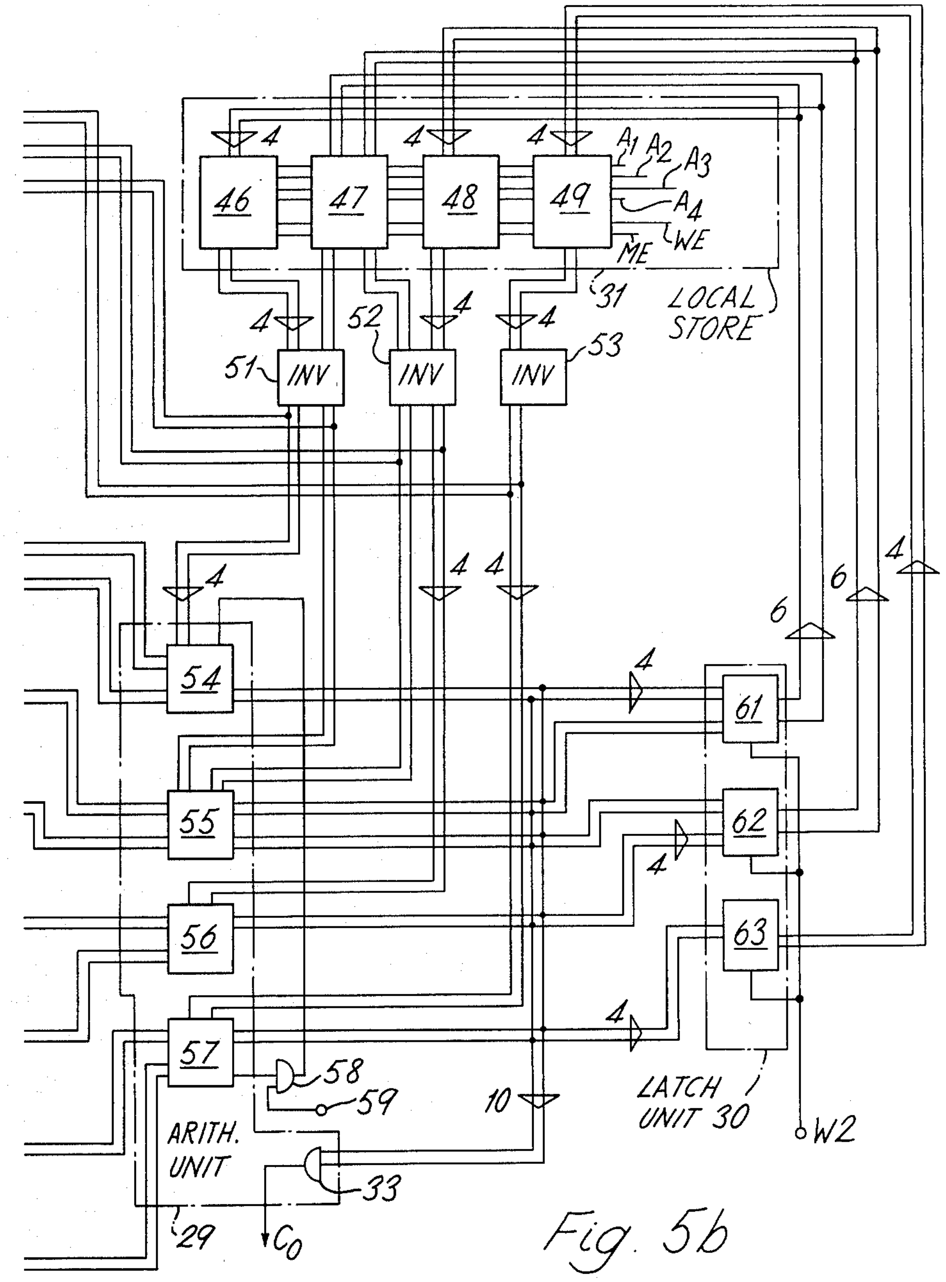
Figure 6:
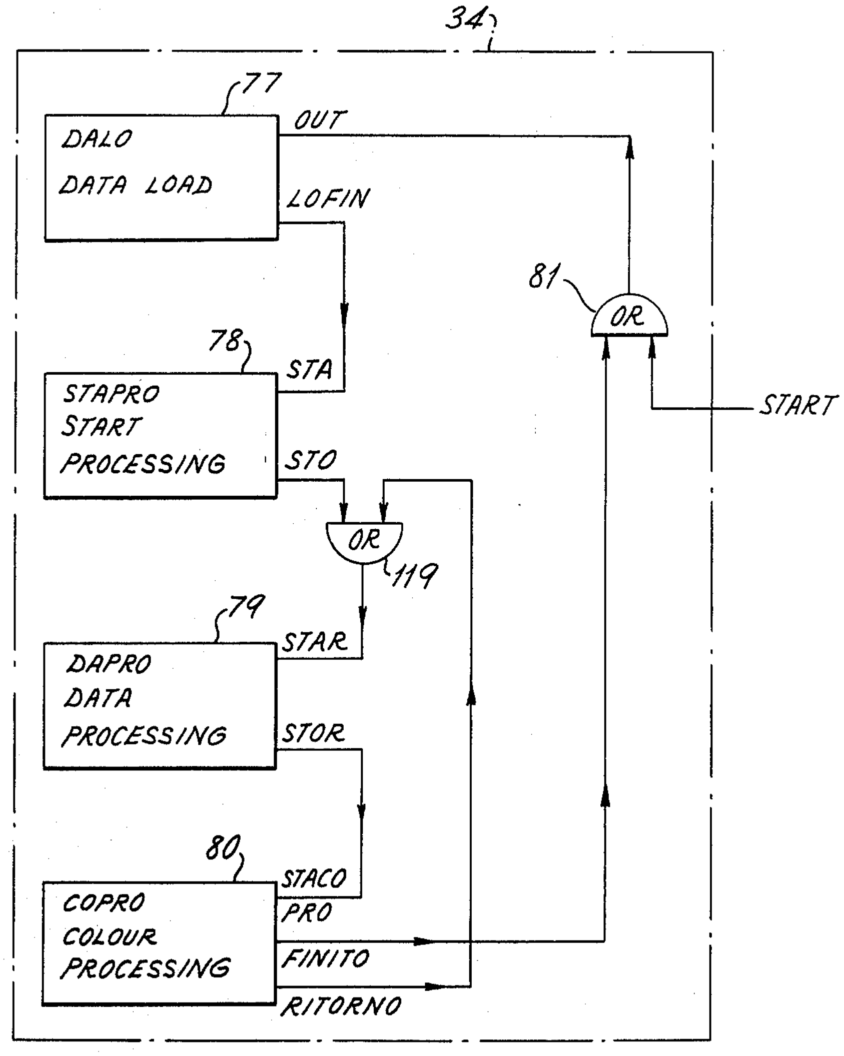
Figure 7A:
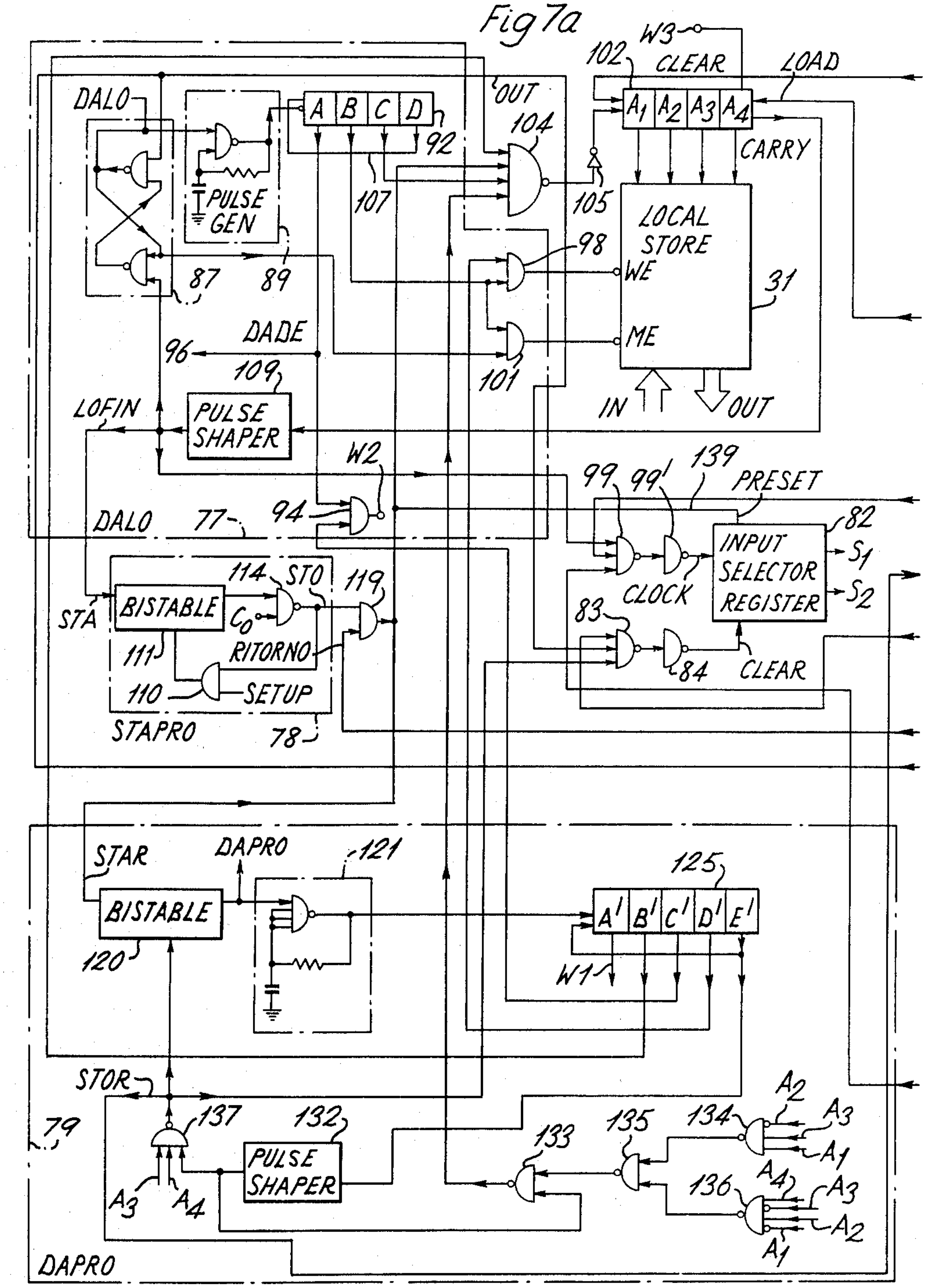
Figure 7B:
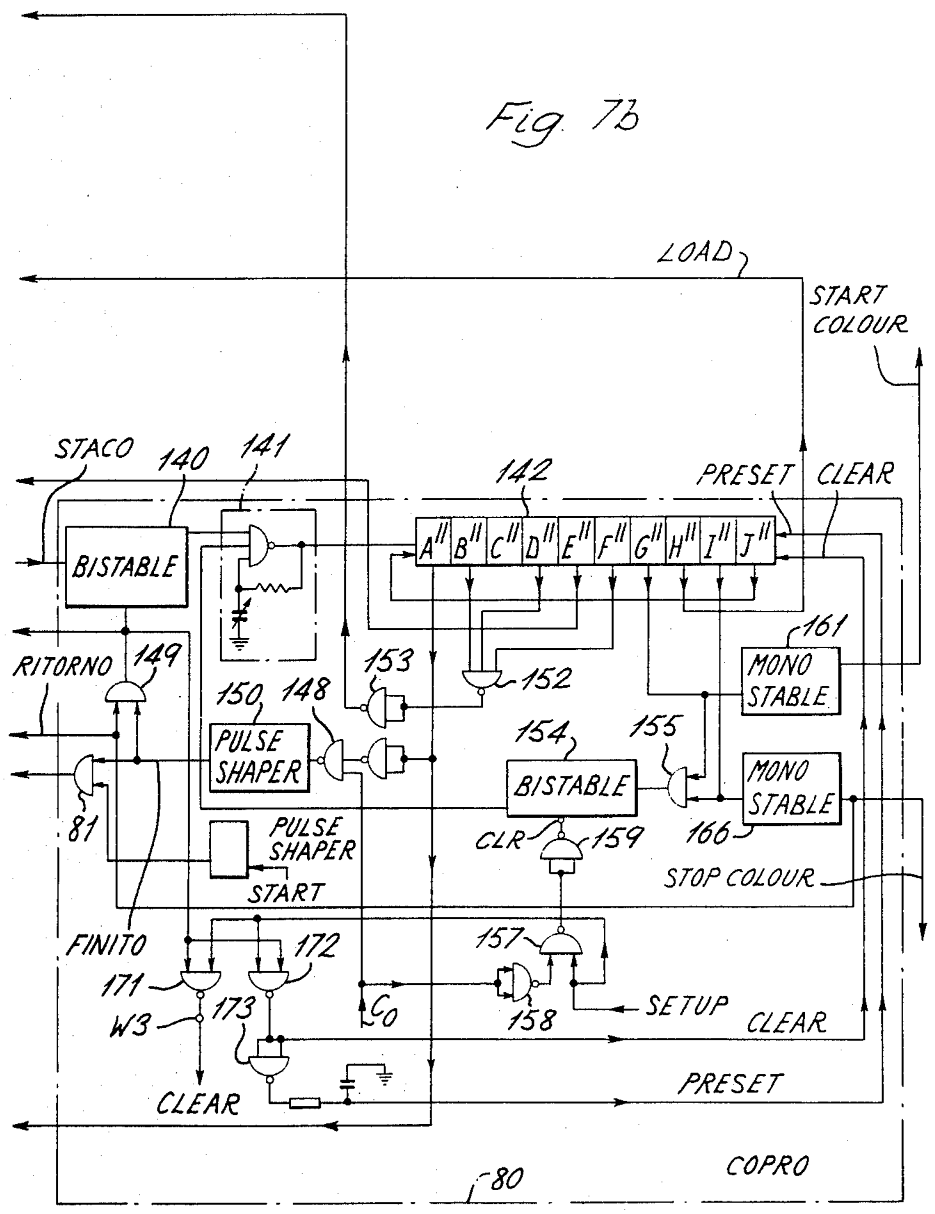

FIG. 2 is a simple example of the display which can be provided by the system of FIG. 1, FIG. 3 is a block diagram of a zone management processor (ZMP) used with others of the same type in the arrangement of FIG. 1, FIG. 4 is a flow diagram used in explaining the operation of FIG. 3, FIGS. 5*a* and 5*b* form a block diagram showing the data storage and data transfer circuits of FIG. 3 in more detail, FIG. 6 is a block diagram of the control circuit of FIG. 3 in more detail, FIGS. 7*a* and 7*b* form a part circuit part block diagram showing the control circuit of FIG. 3 and FIG. 6 in more detail, FIGS. 8 to 11 are flow diagrams used in explaining the operation of FIGS. 5 to 7, and FIG. 12 is a part circuit part block diagram of a priority unit.

[Note that FIGS. 5*a* and 5*b* are intended to be joined along their right and left edges respectively to form a single figure. This also applies to FIGS. 7*a* and 7*b*. In accordance with conventional practice, positive and negative logic is used. Thus while the figures show the actual component circuits used, in some cases the logical operation carried out as described in the specification is different from that apparently indicated by the symbol for the component since, for example, a circuit may receive positive and negative inputs instead of two positive inputs.]

A display system will first be described in outline with reference to FIG. 1, then a data processor or zone management processor (ZMP) used in the arrangement of FIG. 1 will be described in outline, and lastly the ZMP will be described in detail.

Information for a display to be shown on a colour television monitor 10 is held in a buffer store 11 having been transferred there from a computer (not shown) by way of a channel 12.

The display is made up of a number of zones of different colours and intensities. For example in the simple illustration of FIG. 2 the display of an aircraft runway among fields consists of zones 13 and 14 forming the runway and zones 15*a*, 15*b*, 15*c* 16, 17*a*, 17*b* and 20 representing fields. The horizontal lines in FIG. 2 are parallel to the lines of the raster of the display shown by the monitor 10. It will be seen that the zones 13 and 14 are superimposed on the zones 15*a*, 15*b* and 15*c*. A zone may have straight left and right boundaries or one or both of these boundaries may be curved as in the zone 16. Complicated shapes may be made up of several zones such as the zones 17*a* and 17*b*, or a form of zone mentioned above, which has four sides none of which are parallel to raster lines, may be used. Such a zone is shown at 20.

Returning now to FIG. 1, a number of ZMPs 18*a* to 18*n* are coupled to receive information from the buffer store 11 by way of a channel 19. Each ZMP is dynamically allocated to a zone in a display by means of a control unit 21 and each ZMP contains enough information to manage a display for the zone which is, for the time being, allotted to it.

A 16 MHz clock pulse oscillator 22 supplies pulses to a master X counter 23 and a master Y counter 24. The function of these counters is to synchronise the action of the ZMPs with the raster of the television monitor and for this reason X and Y co-ordinate signals from the counters 23 and 24 giving the current point of the beam of the monitor (that is the current display point in the display raster) are supplied to the ZMPs. The co-ordinates travel by way of channels 25 and 26 to each ZMP but only the ends of these channels adjacent to the counters are shown in FIG. 1 in the interests of clarity.

As signals representing a zone managed by a ZMP are received by that ZMP, the ZMP in question takes over the display and supplies signals to the three colour guns of the monitor by way of a digital-to-analogue converter circuit 27 comprising a separate digital-to-analogue converter for each gun. However, where one zone, such as the zone 13 is superimposed on another zone such as 15*c* a ZMP relinquishes management of the monitor temporarily while the raster scans through the superimposed zone.

A ZMP is shown in more detail in FIG. 3. Information from the buffer store 11 passes through a selector 28 whose function it is to control the transfer of information to the ZMP. The data then passes by way of an arithmetic unit 29 and a latch unit 30 to a local store 31. The reason this route is adopted is simply one of convenience in constructing and operating the ZMP.

The information supplied to the local store is as follows:

the co-ordinates of the top of the zone to be managed - $Y_T$, the co-ordinates of the bottom of the zone to be managed - $Y_B$, the initial co-ordinates at $Y_T$ of the left-hand boundary of the zone - $X_L$, the initial co-ordinates at $Y_T$ of the right-hand boundary of the zone - $X_R$, the difference between X co-ordinates in successive raster lines of the left-hand boundary - $X_{LD}$, the difference between X co-ordinates in successive raster lines of the right-hand boundary - $X_{RD}$, the second difference (corresponding to a second differential) between successive left-hand boundary co-ordinates - $X_{L2D}$ the second difference between successive right-hand boundary co-ordinates - $X_{R2D}$, further differences of higher order for the left and right boundary co-ordinates, the initial colour at $Y_T$ within the zone - C, and the colour difference between successive lines in the zone - $C_D$.

The arithmetic unit 29 calculates successive co-ordinates for the left and right boundaries and colour changes within the zone. The unit 29 also acts as a null detector and compares current X and Y co-ordinates of the raster supplied by the selector 28 from the master counters 23 and 24 with $Y_T$, $Y_B$, $X_L$ and $X_R$ supplied from the local store 31. A signal Co is generated when equivalence is determined and this signal is supplied to a control unit 34 which controls the operation of the ZMP. The latch unit 30 and a further latch unit 35 are used for holding information as various operations are carried out.

The operation of the ZMP of FIG. 3 will now be outlined with reference to the flow diagram of FIG. 4. When a ZMP is allocated to a zone the registers of the local store 31 are first loaded in operation 36. A comparison is then continually carried out between the Y co-ordinate $Y_C$ (that is line number) of the current display point in the display raster and the co-ordinate of the top of the zone $Y_T$ (operation 37), this comparison being carried out by the arithmetic unit 29. When $Y_C = Y_T$ the initial X co-ordinates $X_L$ and $X_R$ and the colour information C are incremented with the various differences (operation 38) using the arithmetic unit 29. Next $Y_C$ is compared with the co-ordinate $Y_B$ of the bottom of the zone and if the bottom has not been reached a further comparison is carried out between the current X co-ordinate $X_C$ and the co-ordinate $X_L$ of the left-hand zone boundary (operation 41). When this test indicates that the zone is just entered in a raster, line data controlling the three colour guns in the monitor is passed to the digital to analogue converter 27 (operation 42). At the same time a test to compare $X_C$ with the X co-ordinate of the right-hand boundary $X_R$ is commenced (operation 43). The colour data is applied while the raster sweeps along the line until the right-hand boundary in that line has been reached. Colour information is then stopped from further transfer to the digital-to-analogue converter 27 (operation 44) and the cycle is recommenced at operation 38 with the derivation of the new $X_L$, $X_R$ and C for the next raster line. This cycle is continued until the bottom of the zone is reached as detected in operation 40 when the ZMP has finished the management of its zone and can report to the central control unit 21 that it is now available for the management of a further zone (operation 45).

The construction and operation of a ZMP will now be described in detail. In this regard, reference will be made to various integrated circuits by their type numbers. Such circuits are well known and are described in the publications "The TTL Data Book for Design Engineers", First Edition, 1973 (reprinted in 1975) and "Supplement to the TTL Data Book for Design Engineers", 1974, both published by Texas Instruments Incorporated.

The local store 31, as shown in FIG. 5*b*, comprises four integrated circuits 46 to 49 type 7489 organised as a sixteen word memory. Each word has sixteen bits and each word can be individually selected by address inputs A1, A2, A3 and A4. In FIGS. 5*a* and 5*b* channels connecting integrated circuits are shown by two lines; if a channel has only two connections it is not individually marked but if a channel has four, six or ten connections it bears a triangle with a number denoting the number of connections. Thus it can be seen that the local store has sixteen input connections entering the top of the store as shown in FIG. 5*b* and sixteen output connections at the bottom of the store as shown. The store includes a write enable control (WE) for writing data from the inputs to selected to addresses and a memory enable control (ME) to enable or disable the outputs of the memory on demand. When disabled, all outputs are at a logical "1" and the outputs from the integrated circuits are then opposite to their inputs. Thus the construction of these integrated circuits gives an inversion between input and output and therefore inverting amplifiers 51, 52 and 53, type 7404, are used to invert each one of the sixteen memory outputs and bring them back to the original form.

The arithmetic unit 29 is formed by four integrated circuits 54 to 57 of the four bit adder type 7483. For correct operation during addition an end-around-carry facility is required and this is provided by coupling the most significant stage carry output of the circuit 57 to the least significant stage carry input of the circuit 54 by way of an AND gate 58.

When the arithmetic unit is used as a comparator the adder inputs are presented with two numbers one of which is the complement of one of the numbers to be compared. Under these circumstances when the output of the arithmetic unit consists entirely of "ones" the two numbers are the same and an AND gate 33 is enabled providing the coincidence signal (Co). While comparison is carried out the end-around-carry facility is inhibited and this is achieved by not supplying an enabling input to a terminal 59 of the gate 58. Signals applied to the terminal 59 to operate the gate 58 are provided by the control unit 34 which is described in more detail below.

Integrated circuits 61, 62, 63, 64, 65 and 66 make up the two latch units 30 and 35 respectively. These integrated circuits are type 74174. The input selector circuit 28 (FIG. 5*a*) is formed by eight integrated circuits 68 to 75 type 74153. The input selector provides at its output terminals, a selected one of three external input 16-bit words or a fourth internal input 16-bit word which is transferred to the selector by way of the latch unit 35. The 16 bit output signal is selected from sixty-four input signals by means of signals applied to terminals $S_1$ and $S_2$.

With $S_1 = 0$ and $S_2 = 0$ the DATA input is selected for transfer. It is used during loading when the ZMP passes all zone parameters for a particular zone from the buffer circuit 11 through the selector, and by way of the arithmetic unit 29 and the latch unit 30, into the local store 31.

With $S_1 = 0$ and $S_2 = 1$, $\overline{Y}_c$, obtained by inverting the output of the master Y counter 24, is transferred through the selector. As mentioned above the arithmetic unit uses this quantity (the inversion of $Y_c$) for comparison.

With $S_1 = 1$ and $S_2 = 0$, $\overline{X}_c$, obtained by inverting the output of the master X counter 23, is transferred through the selector.

Finally with $S_1 = 1$ and $S_2 = 1$ internal signals from a latch unit 35 are transferred through the selector and are used during parameter processing.

As will now be clear, when updated parameters are derived an addition is carried out by the unit 29. As will be described later under the alogorithm 'DAPRO' the first operand for addition is addressed in the local store, its value appears in the store outputs and is then temporarily stored in the latch unit 35. Since $S_1 = 1$ and $S_2 = 1$ at this time, the output of the latch unit 35 is connected to one input of the arithmetic unit. Next the second operand is addressed in the local store and presented to the second input of the arithmetic unit, that is by way of the inverters 51, 52, and 53. After allowing time for the addition to take place, the output of the adder holds the result and this output is stored in the latch unit 30 before being written back in the local store.

The control of processing in the circuit of FIGS. 5*a* and 5*b* is carried out by control unit 34 (FIG. 3) and this unit comprises four further units 77 to 80 (see FIG. 6) each of which carries out a particular group of operations designated by the code words DALO (data load), STAPRO (start processing), DAPRO (data processing) and COPRO (colour processing). FIG. 6 shows connections between the various units and signals appear on these connections when various operations have been carried out. These signals are given code words which are also shown.

Figure 8:
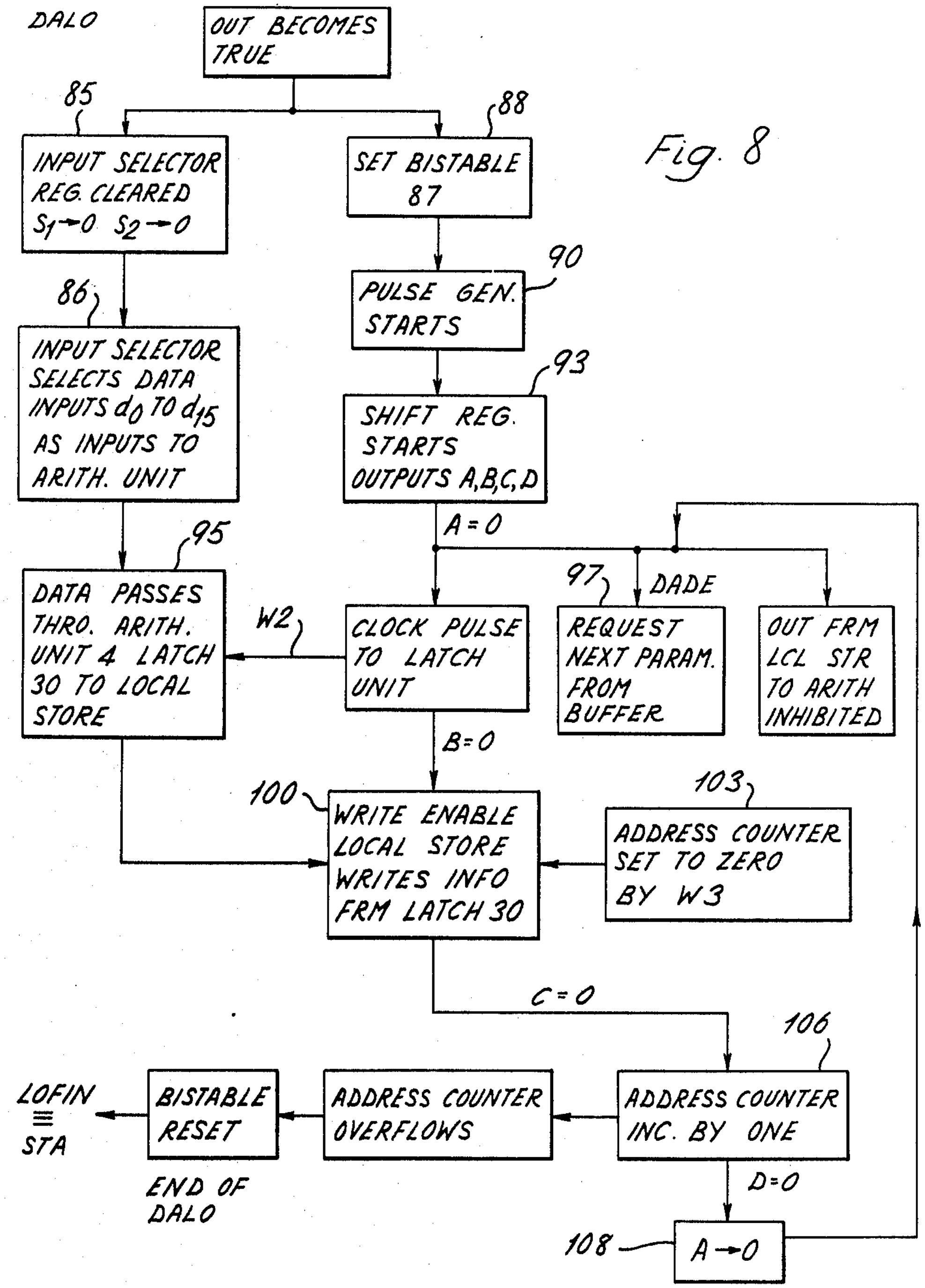

When the equipment is switched on some ZMPs are allocated to zones by the control unit 21 which provides a start signal for an OR gate 81, the output signal from this OR gate being designated 'OUT' and applied to the DALO unit 77 which is shown together with the other units 78, 79 and 80 in more detail in FIGS. 7*a* and 7*b*. Later 'OUT' is signalled by a ZMP when it has finished managing a zone and is ready to manage another zone, as will be explained. DALO is responsible for the transfer and loading of all the zone parameters into the local store 31 from the buffer store 11. When 'OUT' (see FIGS. 6, 7 and 7*b*) becomes true an input selector register 82 is cleared by the out signal passing through an OR gate 83 and an inverter 84. The register 82 provides the signals $S_1$ and $S_2$ controlling the input selector 28. FIG. 8 shows a flow diagram for the unit DALO and operation 85 clears the input selector register as mentioned.

When $S_1 \rightarrow 0$ and $S_2 \rightarrow 0$ lines $d_0$, $d_1 \ldots d_{15}$ from the buffer store 11 are selected as inputs to the arithmetic unit which simply provides passage via latch unit 30 to the local store. Data inputs form the upper two inputs to each of the units 68 to 75 as is shown in FIG. 5. The operation of coupling the buffer store to the arithmetic unit by way of the input selector is operation 86 in FIG. 8.

The OUT signal also sets a bistable circuit 87 in operation 88 and starts a pulse generator 89 in operation 90. The pulse generator delivers pulses to a recirculating register 92 (operation 93) which operates so that only one of its four outputs A, B, C and D is "zero" at any one time. The first pulse from the generator 89 causes A " 0 and when each of the outputs A, B, C and D become zero a specific action occurs as follows.

With $A = 0$ an output $W_2$ is produced by an OR gate 94, $W_2$ being the clock input to the latch unit 30 (see FIG. 5). The appearance of $W_2$ causes the latch unit 30 to store the information presented on lines $d_0$ to $d_{15}$ via the buffer unit 11. (Operation 95)

$A = 0$ also causes a signal DADE (data demand), this signal appearing on a line 96 passes back to the buffer store 11 causing the buffer store to present the next parameter on lines $d_0$ to $d_{15}$ (operation 97). The next pulse from the generator 89 causes $B \rightarrow 0$, signalling, via an OR gate 98, WE (write enable) for the local store. (Both FIGS. 5*b* and 7*a* show store 31.) Thus in operation 100 signals from the latch unit 30 are written in to the local store 31. To avoid an unwanted output from the local store to the arithmetic unit while $A = 0$ the ME (memory enable) signal is not applied to the local store but when $B = 0$ the ME signal by way of a gate 101 is applied to the store to allow the write operation. The second input to AND gate 101 is true during the whole of the DALO phase since the bistable 87 remains in the same state during DALO. At times other than DALO the local store memory enable is permitted.

An address counter 102 specifies the locations at which words are entered in the store 31. As will be explained below, a signal $W_3$ to set the register 102 to zero in operation 103 is generated under certain conditions such as when a ZMP is allocated to a zone.

The counter 102 is a reversible binary counter type 74193. When $C = 0$ a signal by way of a gate 104 and an inverter 105 causes the counter 102 to be incremented by one, in operation 106, by applying a signal to the "up" input.

When $D = 0$ a recirculating connection 107 causes $A \rightarrow 0$ on the next pulse from the generator 89 (operation 108). Thus the cycle of requesting data from the buffer passing it through the input selector, the arithmetic unit and the latch unit 30 and writing it in the local store 31 is repeated. The cycle is carried out a total of 16 times transferring the 16 parameter words from the buffer store to the local store.

When the address counter 102 overflows a signal appears on its carry output and after pulse shaping in a pulse shaper 109 it resets the bistable 87 terminating DALO. The pulse shaper 89 also provides a signal LOFIN (loading finished) which appears in FIG. 6 and is synonymous with the signal STA which initiates the STAPRO phase.

Figure 9:
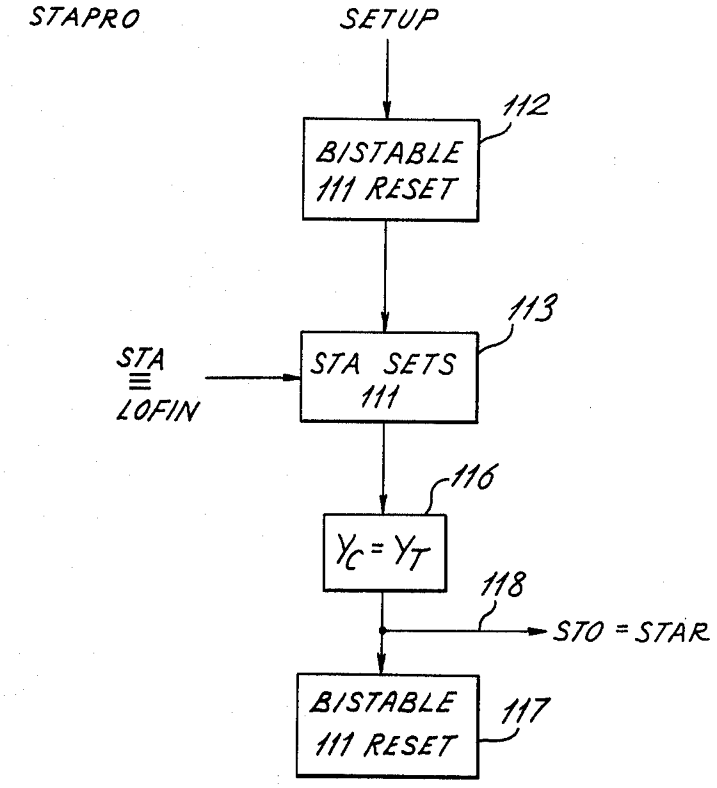

When the equipment is switched on a SETUP signal is applied to an OR gate 110 which resets a bistable 111 but this bistable is reset by the signal STA from DALO, this being operation 113 in FIG. 9.

The register 102 now stands at $A_1 = A_2 = A_3 = A_4 = 0$ and $Y_T$ is presented to one input of the arithmetic unit 29 by way of the inverters 51, 52, and 53. LOFIN passes by way of an OR gate 99 and an inverter 99' to the input selector register 82 and $S_1 \rightarrow 0$, $S_2 \rightarrow 1$. Hence the current Y position of the raster sweep $Y_C$ appearing inverted as $\overline{Y_C}$ in ten bits $\overline{my_0}$ to $\overline{my_9}$ passes through the selector 28 to the other input of the arithmetic unit 29. When $Y_C = Y_T$, i.e. $\overline{Y_C} + Y_T = 1$, Co appears at the output of the gate 33 in FIG. 5. Thus when the current raster position reaches the top of the zone the signal Co appears (operation 116) and a gate 114 opens resetting the bistable 111 by way of a gate 110 in operation 117. At the same time the output of an OR gate 119 goes low momentarily signifying the end of STAPRO (operation 118). The STAPRO phase is equivalent to operation 37 in FIG. 4, and STO is equivalent to STAR which initiates DAPRO (data processing) by way of the OR gate 119 also shown in FIG. 6.

Figure 10:
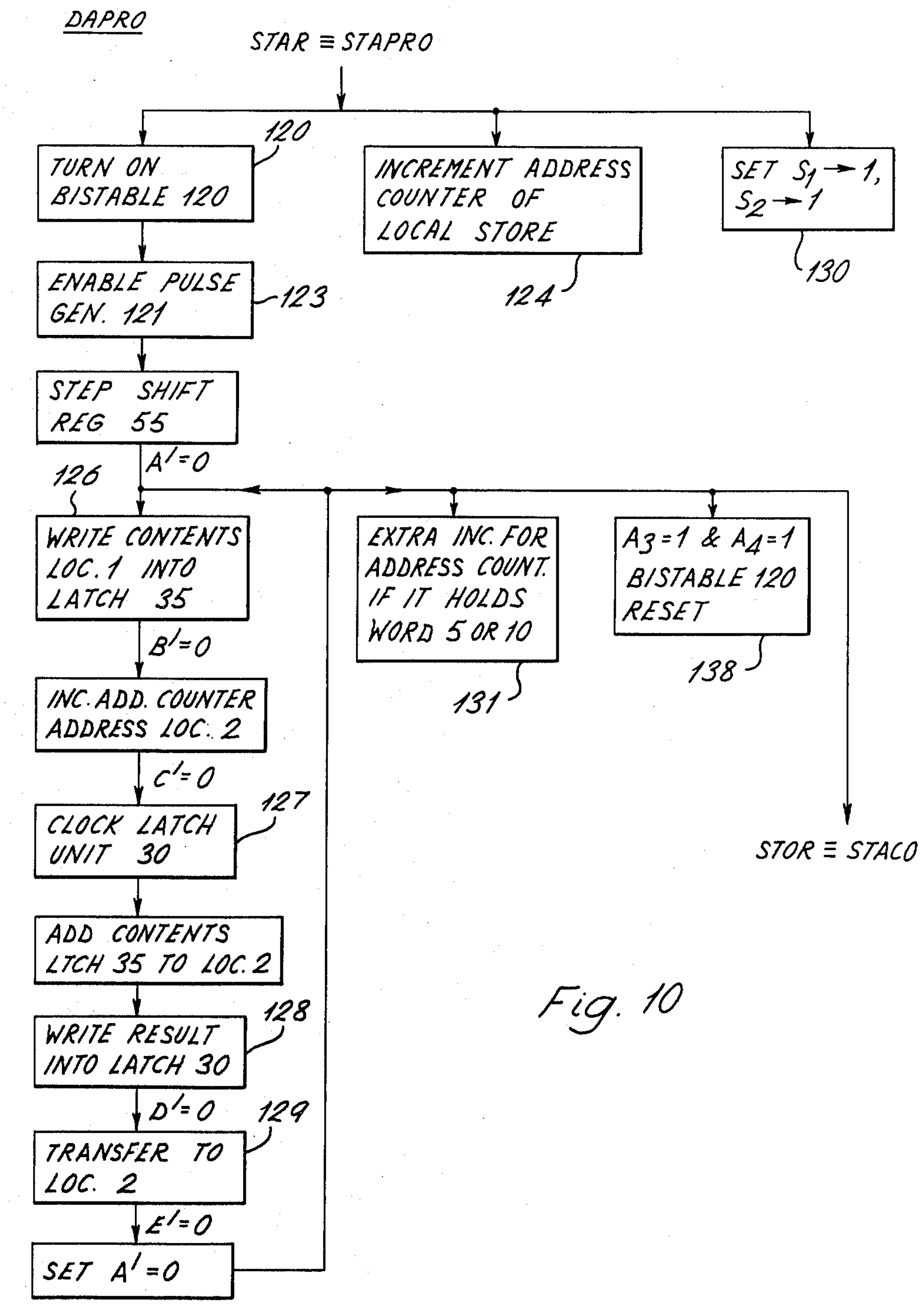

When the signal STAR appears a bistable 120 is set and a pulse generator 121 is initiated, in operations 122 and 123 of FIG. 10. At the same time the signal STAR passing by way of the gate 104 increments the address counter 102 of the local store so that location 1 in the store is selected (operation 124).

A shift register 125 steps as pulses are supplied from the generator 121 and as with the register 92 only one output of outputs A', B', C', D' and E' is zero at any one time.

With A' = 0 the clock input of the latch unit 35 is enabled by W1 and the contents of the first location of the local store is read out by way of inverters 51, 52 and 53 and written in to the latch unit 35 (operation 126). As will be seen from Table I below, the word in the first local store location is $X_{R4D}$ the fourth difference of the X co-ordinate of the right-hand boundary. The appearance of STAR causes a signal to pass by way of the connection 139 to apply a signal to the preset input of the input selector register 82 causing $S_1 \rightarrow 1$ and $S_2 \rightarrow 1$ (operation 130) connecting the outputs of latch 35 by way of the input selector to the inputs of the arithmetic unit 29.

On the next pulse from the generator 121, $B' \rightarrow 0$ and a signal by way of the gate 104 causes the local store address counter 102 to be incremented by one selecting the second location in the local store.

The next pulse from generator 121 causes $C \rightarrow 0$ and a signal $W_1$ is applied to the OR gate 94 to generate the signal $W_2$ clocking the latch unit 30 in operation 127. The effect is to perform the addition of the contents of location 2 in the local store by way of inverters 51, 52 and 53 to the contents of latch unit 35 using the adder 29, and to write the sum into latch unit 30 (operation 128). From Table I it will be seen that location 2 holds the third X co-ordinate difference of the right-hand zone boundary so that as is shown in Table II, cycle number 1 operation 128 updates $X_{R3D}$, carrying out $X_{R3D}: = X_{R3D} + X_{R4D}$.

When $D' \rightarrow 0$ as a result of the next pulse from the generator 121 the write enable of the local store 31 receives signal WE causing the contents of latch unit 30 to be written into the second location of the store (operation 129).

Locations of the local store are designated as shown in Table I below; values of the address counter 102 are also shown.

Table I

| Word number | $A_4$ | $A_3$ | $A_2$ | $A_1$ | Usage |
|---|---|---|---|---|---|
| 0 | 0 | 0 | 0 | 0 | $Y_T$ |
| 1 | 0 | 0 | 0 | 1 | $X_{R4D}$ |
| 2 | 0 | 0 | 1 | 0 | $X_{R3D}$ |
| 3 | 0 | 0 | 1 | 1 | $X_{R2D}$ |
| 4 | 0 | 1 | 0 | 0 | $X_{RD}$ |
| 5 | 0 | 1 | 0 | 1 | $X_R$ |
| 6 | 0 | 1 | 1 | 0 | $X_{L4D}$ |
| 7 | 0 | 1 | 1 | 1 | $X_{L3D}$ |
| 8 | 1 | 0 | 0 | 0 | $X_{L2D}$ |
| 9 | 1 | 0 | 0 | 1 | $X_{LD}$ |
| 10 | 1 | 0 | 1 | 0 | $X_L$ |
| 11 | 1 | 0 | 1 | 1 | $C_D$ |
| 12 | 1 | 1 | 0 | 0 | C |
| 13 | 1 | 1 | 0 | 1 | $Y_B$ |
| 14 | 1 | 1 | 1 | 0 | Spare |
| 15 | 1 | 1 | 1 | 1 | Spare |

When the next pulse from the generator 121 occurs $E' \rightarrow 0$ and the next cycle occurs in which the updated $X_{R3D}$ is used to derive $X_{R2D}$ available in the third location of the local store.

The above description of DAPRO as it has been explained so far will show that the second cycle and subsequent cycles will carry out the updating of various parameters as given in Table II below, but words 5 and 10 in Table I are not used in cycles 5 and 9, respectively, as will now be explained. When $E' \rightarrow 0$ a pulse is generated by a pulse shaper 132 and this forms one input to an AND gate 133 which is enabled, as will be explained below, when the register 102 addresses locations holding the words 5 and 10. When the AND gate 133 opens the counter 102 is given an extra increment (operation 131) by way of the gate 104 so arranging for words 5 and 10 to be omitted from the additions carried out by DAPRO. When $A_1 = 1, A_2 = 0$ and $A_3 = 1$ an output is obtained from an AND gate 134 which passes by way of an OR gate 135 to enable the gate 133, this address corresponding to the word five. Similarly when $A_1 = 0$, $A_2 = 1$, $A_3 = 0$ and $A_4 = 1$, corresponding to the word ten, an output is obtained from an AND gate 136 so that the gate 133 is enabled by way of the OR gate 135.

Finally when $A_3 = 1$ and $A_4 = 1$ and in addition E' reaches zero, an AND gate 137 is enabled terminating DAPRO by resetting the bistable 120 in operation 138 and generating the signal STOR which is synonymous with signal STACO (see FIG. 6). Operation 38 of FIG. 4 is now complete.

Table II

| Cycle Number | LU35 | LU30 | Effect |
|---|---|---|---|
| 1 | word 1 | word 2 | $X_{R3D}: = X_{R3D} + X_{R4D}$ |
| 2 | word 2 | word 3 | $X_{R2D}: = X_{R2D} + X_{R3D}$ |
| 3 | word 3 | word 4 | $X_{RD}: = X_{RD} + X_{R2D}$ |
| 4 | word 4 | word 5 | $X_R: = X_R + X_{RD}$ |
| 5 | word 6 | word 7 | $X_{L3D}: = X_{L3D} + X_{L4D}$ |
| 6 | word 7 | word 8 | $X_{L2D}: = X_{L2D} + X_{L3D}$ |
| 7 | word 8 | word 9 | $X_{LD}: = X_{LD} + X_{L2D}$ |
| 8 | word 9 | word 10 | $X_L: = X_L + X_{LD}$ |
| 9 | word 11 | word 12 | $C: = C + C_D$ |

The colour processing phase (COPRO) is now initiated, this being the phase in which the electron guns of the monitor 10 are controlled by that ZMP for the time being in operation.

Figure 11:
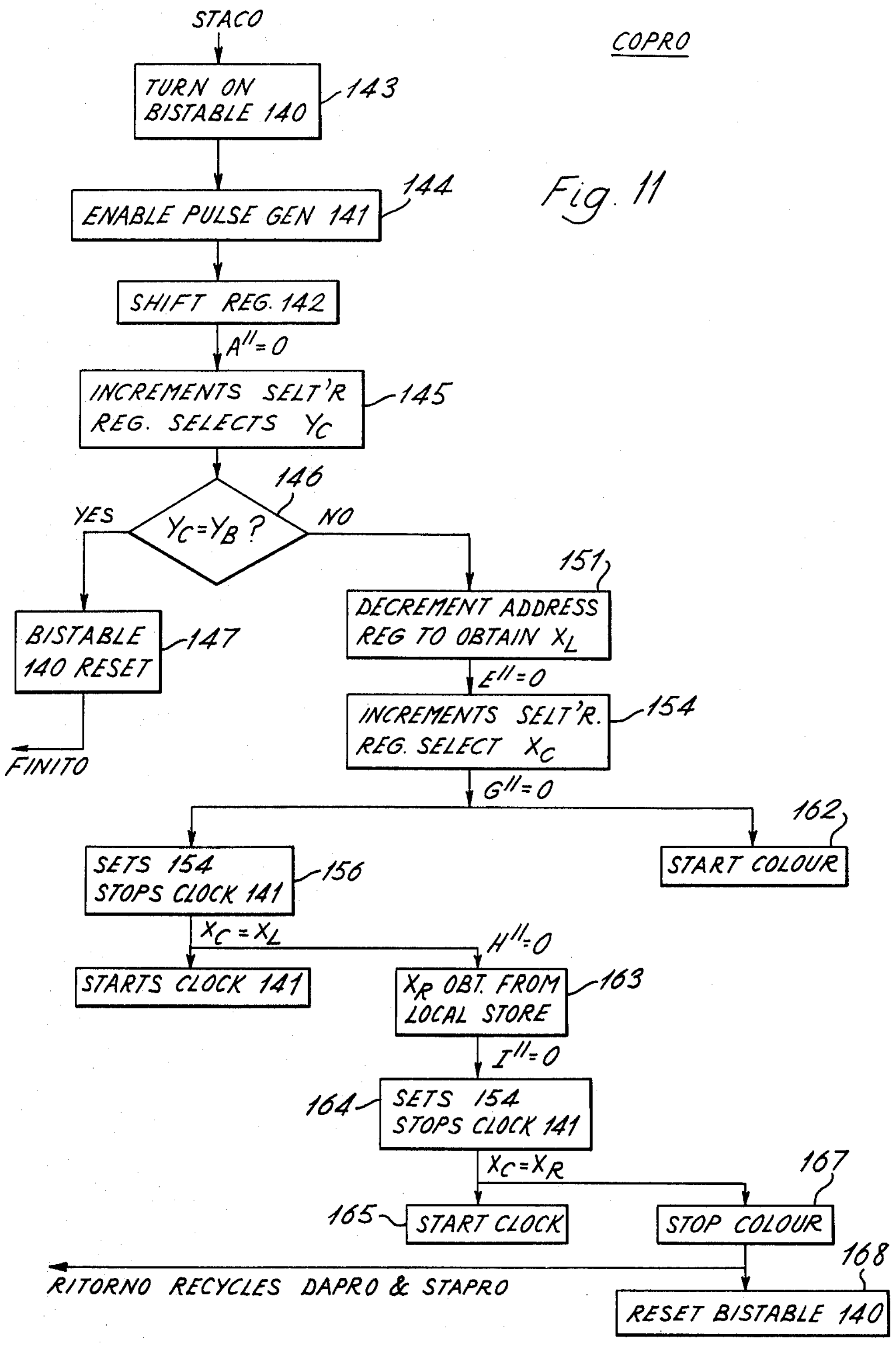

The signal STACO turns on a bistable 140 which enables a pulse generator 141 coupled to a shift register 142 of the same general type as shift registers 102 and 125 but in this case there are 10 stages with outputs A" to J". In FIG. 11 turning on the bistable 140 and enabling the pulse generator 141 are operations 143 and 144, respectively.

The signal STOR, equivalent to STACO, is passed by way of the gates 83 and 84 which function as an OR gate to the input selector register to reset this register.

After DAPRO the address counter stands at location 13 so that $Y_B$ is applied to the arithmetic unit 29.

When $A'' \rightarrow 0$ the input selector register is incremented by one by way of the OR gate 99 so that $S_1 \rightarrow 0$ and $S_2 \rightarrow 1$ (operation 145). This connects the master counter 23 (FIG. 1) containing the current Y co-ordinate of the raster to the arithmetic unit by way of the selector 28. The current Y and X co-ordinates have only ten bits so that the third to sixth inputs of the circuits 68, 69, 70 are not used, but in fact a logical one is applied permanently to these inputs because the current X and Y co-ordinates are in inverted form to allow the arithmetic unit to carry out addition in performing as the null detector 29. The inverted bit $\overline{my_0}$ to $\overline{my_9}$ appear in pairs as inputs to circuits 71 to 75.

With counter 102 selecting word 13, that is $Y_B$, then if during $A'' = 0$, Co becomes true (operation 146) then bistable 140 is reset in operation 147 by way of gates 148 and 149 and pulse shaping circuit 150. This means the bottom of the zone has been reached and the end of COPRO is signalled with FINITO passing by way of the gate 81, see also FIG. 6, to allow the parameters of a new zone to be loaded in phase DALO. (Step 45 in FIG. 4.)

However, if $Y_C$ does not equal $Y_B$ the sequence continues and for $B'' \rightarrow 0$ $D'' \rightarrow 0$ and later $F'' \rightarrow 0$ the address register 102 is decremented three places in operation 151 to obtain word ten, $X_L$. This decrementing is carried out by way of an OR gate 152 and an inverter 153 connected to the count-down input of the counter 102. Meanwhile for $E'' \rightarrow 0$ the input selector 82 is again pulsed in operation 154 to provide $S_1 \rightarrow 1$ and $S_2 \rightarrow 0$ selecting the inverted current X co-ordinate signal $\overline{mx_0}$ to $\overline{mx_9}$ which appear as ten bits in five pairs at inputs of circuits 71 to 75. Hence the arithmetic unit acting as null detector now compares $X_C$ with $X_L$ (operation 41 in FIG. 4).

The leading edge of G'' sets a bistable 154 by way of an OR gate 155 in operation 156 and setting this bistable stops the oscillator 141 until $X_C = X_L$ when Co becomes true and resets the bistable 154 through an OR gate 157 and inverters 158 and 159. The trailing edge of G'' occurs and triggers a monostable circuit 161 which provides the signal 'START COLOUR' (operation 162). This signal releases the hue and intensity data from the local store to the digital to analogue converter 27.

When $H'' \rightarrow 0$, the signal LDA is applied to the local store address counter 102 and the outputs of this counter assume the value of their 'data inputs', this being a feature of the 74193 integrated circuit used for the circuit 102. Since these data inputs are hard wired to give the address 0101 the outputs of the circuit 102 now correspond to the address of $X_R$. The arithmetic unit now compares $X_C$ with $X_R$.

The leading edge of $I'' \rightarrow 0$ sets the bistable 154 through the gate 155 so stopping the oscillator 151 once more, in operation 164. The clock starts again only when the right-hand boundary is reached, that is $X_C = X_R$, in operation 165. When Co becomes true the bistable 154 is reset by way of the gate 157 and the inverters 158 and 159. The trailing edge of $I'' \rightarrow 0$ then triggers a monostable 166, the signal "stop colour" is produced in operation 167, and the colour signal applied to the D - A converter 27 no longer controls the monitor 10. The monostable 166 also resets the bistable 140 by way of the gate 149 and thus COPRO is terminated. At the same time a signal RITORNO is applied to gate 119 so that DAPRO and COPRO are repeated, the procedures cycling for each line of the raster until the lower boundary is reached, that is $Y_C = Y_B$, when FINITO appears and the ZMP is ready to manage another zone.

A gate 171 provides the signal $W_3$ to clear the address counter 102 when FINITO or RITORNO occur, and gates 172 and 173 clear and preset the register 142 at the same time or when the equipment is switched on.

The buffer store 11 holds some multiple of the sixteen words representing a zone, for example 1024 sufficient for sixty four zones. The buffer store may be a "circular store" in which two registers are provided in addition to the main storage or alternatively these registers may be regarded as part of the control unit 21. Each of these registers holds a number related to the range 0 to 63 of zones but each number actually held is the product of a number in the said range with 16 (realised by adding four least significant zeros to a number in the range). The numbers held are then the addresses of blocks of sixteen words, the number in one register being the address of the head of a queue of zone-parameter blocks and the number in the other register being the address of the tail. The blocks and words within the blocks are in successive store addresses, with the blocks in the order in which the zones are required in the display.

When a ZMP generates FINITO, the parameters in the block given by the address in the first register are loaded into that ZMP in the DALO phase, and the addresses held by the two additional registers in the buffer are each incremented by sixteen. When either register reaches 1023 it is returned to zero on the next increment but this operation is conditional on the opening of an AND gate to inhibit repetition if not required. Thus as a ZMP finishes dealing with one zone in a frame of the display, the parameters of the next zone not already allocated to a ZMP are transferred to the newly freed ZMP.

The arrangement specifically described so far does not allow one zone to be superimposed on another in the way mentioned in connection with FIG. 2. This feature is achieved by giving each zone a priority which determines whether that zone is superimposed on others. The priority is a parameter which is held in the local store of the ZMP managing the zone. A priority unit (not shown) but which may be considered as part of the control unit 21 is added which includes a number of pairs of registers, one intended for each of the possible clashing zones, one register of the pair to hold a priority value and one to hold an identification of the ZMP having that priority. The priority unit continuously scans the potentially active ZMPs, that is ZMPs in which a signal $C_1$ is true. The signal $C_1$ is obtained by an additional comparison similar to that which provides Co; this additional comparison occurs immediately prior to that for Co and is a comparison between the $X_c$ value augmented by adding a small value (say 10). Thus $C_1$ is a signal which occurs ahead of the signal $C_o$ and allows a short interval of time for the priority unit to operate. On the occurrence of $C_1$, the priority value of that ZMP is transferred to the first of an available pair of registers in the priority unit and the identity of the ZMP is transferred to the second register of the pair. The priority unit continuously operates to determine the highest priority value currently held in its registers and sends an enabling signal to the chosen ZMP. When this enabling signal and the output of monostable 161 (start colour) are both true, the contents of the colour registers are fed to the digital-to-analogue converters and thus cause the electron guns of the cathode ray tube to be controlled appropriately.

Figure 12:
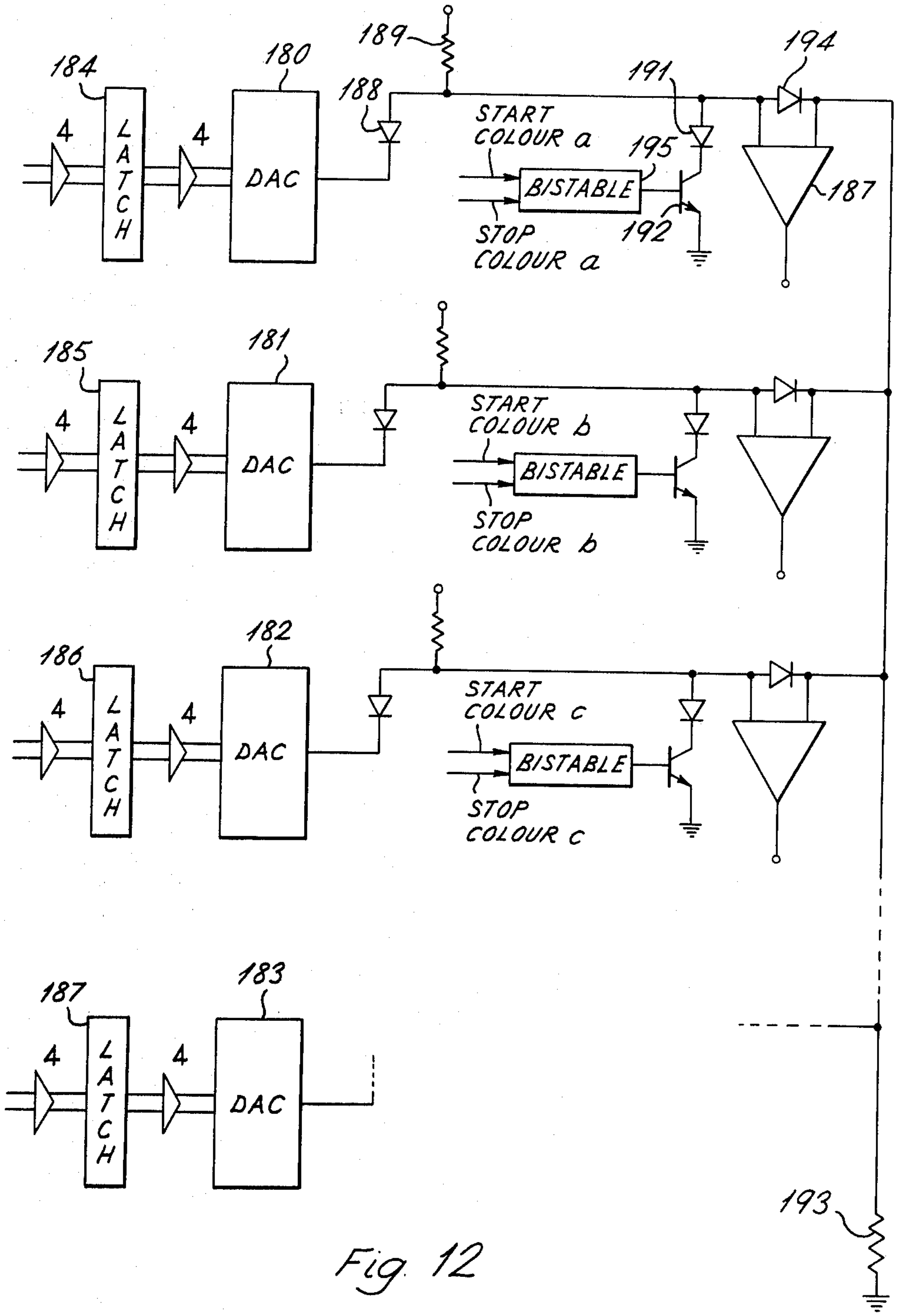

An alternative priority unit which again may be regarded as part of the control unit 21, has one further digital-to-analogue converter circuit (DAC) for each ZMP so that in the example shown in FIG. 12 which is for an arrangement comprising sixteen ZMPs there are sixteen DACs four of which 180 to 183 are shown. Each DAC has a latch circuit with output connected at the DAC's input and those for the DACs 180 to 183 are designated 184 to 187, respectively. In this example each latch is required to hold a 4-bit number representing the priority value of a zone so each latch may be made up from four bistable circuits. The latch circuits are set with the relative priority value. Each ZMP will have a different relative priority value in the range 0–15. This relative priority value is obtained immediately prior to each scan line by sorting the priority values held in all ZMPs in to ascending order. The sort is performed for each line to allow the relative priorities to vary as new zones are allocated to ZMPs. The output from each DAC is a positive voltage proportional to the number held by the latch circuit connected thereto.

A circuit connected at the output of the DAC 180 is now briefly described and similar circuits are connected to the other DACs. The DAC 180 is connected to one input of a voltage comparator 187 by way of a diode 188 the anode of which is connected through a resistor 189 to a terminal held at a positive voltage higher than that corresponding to any priority value. The said input of the comparator 187 is also connected by way of a diode 191 to a transistor 192 which is switched off when a bistable circuit 195 is set. The bistable circuit 195 is set by the "START COLOUR" signal (see FIG. 7*b*) and reset by the "STOP COLOUR" signal. Thus only when the associated ZMP is ready to pass colour information to the monitor does the voltage equivalent to the priority value reach the comparator 187.

Most television displays use the interlaced scanning systems and to adapt the specifically described system to interlacing the local store contains two additional words $'X_L$ and $'X_R$.

In the interlaced scan, the full scan of say 601 lines is performed in two half-scans of 300.5 lines. The odd-numbered lines are scanned in the first half-frame and the even-numbered lines in the second half-frame. The two half-frames may be defined by taking a number $n$ such that the lines in the odd half-frame are numbered $2n+1$ and those in the even half-frame are numbered $2n$ where $$0 \leq n \leq 300$$

The ZMP operates as before except that the unprimed registers are used in the odd half-frame and the primed words $'X_L$, $'X_R$ in the even half-frame. Initially $$'X_L := X_L + X_{LD};\ 'X_R := X_R + X_{RD}$$

then as $n$ increases by 1, $X_L$, $X_R$ are incremented (odd half-frame) and $'X_L$, $'X_R$ are incremented (even half-frame) thus $$X_L := X_L + 2X_{LD};\ X_R := X_R + 2X_{RD}$$

$$'X_L := 'X_L + 2X_{LD};\ 'X_R := 'X_R + 2X_{RD}$$

There is a restriction also that ZMPs must remain allocated to zones for the entire two half-frames.

The specific description has dealt with zone generation where zones have parallel upper and lower boundaries and a constant colour or a continuous gradation thereof. By superimposing zones colours within areas can vary. Another type of four sided zone has been mentioned which is defined in terms of an upper extreme point and quantities for calculating the other vertices of the zone, and the construction of ZMPs for this type of zone, and many other zone types, will be apparent from the foregoing description of a ZMP.

We claim:

1. Apparatus for controlling intensity in a raster display, including a plurality of data processors each capable, when supplied with signals defining a zone of a display, of managing the display of that zone by providing intensity control signals when that zone is to be displayed, allocation control means for allocating the data processors to zones, and means for transferring signals defining zone boundaries to the data processors under the control of the allocation control means, each data processor including a local store for storing signals defining the boundaries of a zone allocated to that data processor, means for deriving signals representing the co-ordinates of points in the boundaries of the zone allocated from the signals stored, comparison means for comparing signals representing the co-ordinates of the current display point in the display raster with the signals representing the co-ordinates of the said points, and local control means, coupled to the comparison means, for passing control signals for determining the intensity of the display within the zone allocated to the output of the processor when the said co-ordinates of the current display point are within the zone allocated to that processor.

2. Apparatus according to claim 1 for use when the signals defining the zones to be displayed include signals representing the co-ordinates in a first direction at right angles to the lines of the raster of the two extremes of the zone, and signals defining first and second boundaries of the zone between the raster lines containing the said extremes, the means for deriving signals of each processor then being constructed to derive the signals representing co-ordinates from stored signals representing the extremes of the zones and stored signals defining the boundaries.

3. Apparatus according to claim 2 for use when the first direction and a second direction are the vertical (Y) and the horizontal (X) co-ordinates of a display, the raster lines making up the display are parallel to the second direction, the signals defining the zone boundaries include signals specifying the difference between successive X co-ordinates in a left-hand boundary of the zone and the difference between the successive X co-ordinates in a right-hand boundary of the zone, the means for deriving signals of each processor then including means for calculating the X-co-ordinates of the left and right-hand boundaries in each line from these differences.

4. Apparatus according to claim 3 for use when the signals defining zone boundaries include signals specifying at least second order differences between successive X co-ordinates in both left and right zone boundaries, when the means for deriving signals of each processor is constructed to use at least the second order differences, in calculating the co-ordinates of the boundaries in each line.

5. Apparatus according to claim 1 wherein the means for deriving signals of each processor includes selection means for receiving the signals which define the boundaries of a zone, signals from the store and signals representing the said current co-ordinates, and an arithmetic unit for summing input signals thereto, having first and second inputs coupled to the selection means and the local store, respectively, the local control means being constructed to supply signals to the selection means and the local store controlling the application of signals to the arithmetic unit.

6. Apparatus according to claim 5 wherein the comparison means of each processor includes means coupled to the output of the arithmetic unit to determine when all concurrent binary output digits thereof are the same.

7. Apparatus according to claim 5 wherein each processor is constructed to receive signals defining the intensity and hue of a zone and wherein the local control means of each processor includes first, second and third sequential controller circuits for controlling the loading of data into the local store, data processing for calculating the zone boundaries, and color processing for controlling the application of signals defining the intensity and hue of a zone to the output of the processor, respectively, each sequential controller circuit being constructed to pass sequentially through a plurality of conduction states in which various operations are carried out, and means for causing the operation of that sequential controller circuit appropriate to the current position in a cycle of operation of the data processor in dependence upon input signals to the data processor and signals from the other sequential controller circuits.

8. Apparatus according to claim 1 wherein the local store, the means for deriving signals, the comparison means and the local control means of each processor are formed by a programmed computer.

9. Apparatus according to claim 3 wherein the local store, the means for deriving signals, the comparison means and the local control means of each processor are formed by a programmed computer.

10. Apparatus according to claim 1 including a plurality of storage means, one for, and associated with each data processor, for storing a signal specifying the priority of the zone allocated to the associated data processor, the priority of a zone indicating whether the zone should be superimposed on another zone, further comparison means for comparing signals representing the contents of the storage means, and a plurality of gating means, one for, and associated with each data processor, for allowing signals representing the contents of the storage means associated with the same data processor to be applied to the comparison means when enabled by signals from the associated data processor indicating that the current display point in the raster falls within the zone allocated to that data processor, the comparison means provision, in operation, an enabling signal for allowing that data processor having the zone of highest priority allocated thereto and containing the current display point to manage a display of the zone allocated thereto.

11. Apparatus according to claim 1 including a digital-to-analogue converter for converting digital signals specifying zone intensity appearing at the output of data processors to analogue signals, and raster display means comprising a cathode-ray tube with the electron gun thereof coupled to receive the analogue signals from the converter.

12. Apparatus according to claim 11 wherein the raster display means is capable of providing colour displays, the local stores, in operation, store signals specifying the hue of a zone, and the local control means of each data processor provide signals specifying hue at an output of the data processor when the said current display point is within a zone allocated to that data processor.

13. Apparatus according to claim 1 wherein the data processors, the control means and the allocation means for transferring signals defining zone boundaries are formed by a programmed computer.

* * * * *